United States Patent [19]

Weinberg et al.

[11] Patent Number: 4,567,068
[45] Date of Patent: Jan. 28, 1986

[54] BLOW-MOLDED PLASTIC BODY

[75] Inventors: Ekkehard Weinberg, Schönwald; Rolf Hameister, Hof/Salle-Leimitz, both of Fed. Rep. of Germany

[73] Assignee: Rehau Plastiks AG & Co., Rehau, Fed. Rep. of Germany

[21] Appl. No.: 587,766

[22] Filed: Mar. 9, 1984

[30] Foreign Application Priority Data

Mar. 10, 1983 [DE] Fed. Rep. of Germany ....... 3308483

[51] Int. Cl.$^4$ ............................................ B60R 13/00
[52] U.S. Cl. ...................................... 428/31; 428/35; 428/36; 428/131
[58] Field of Search ...................... 428/31, 35, 36, 131; 138/177, 118, 128, DIG. 11, DIG. 7; 293/122, 121, 120, 108; 152/320, 322; 150/50; 4/652, 286, 290, 292; 49/475, 488, 489, 492, 498, 497, 499, 496, 476, 479, 488; 280/770

[56] References Cited

U.S. PATENT DOCUMENTS

| 1,169,667 | 1/1916 | Meguyer | 428/36 |
| 2,794,221 | 6/1957 | Bedics | 49/479 |
| 4,471,827 | 9/1984 | Czapar | 428/36 |

FOREIGN PATENT DOCUMENTS

| 2536766 | 10/1978 | Fed. Rep. of Germany . |
| 3016652 | 11/1981 | Fed. Rep. of Germany . |
| 1527663 | 4/1976 | United Kingdom . |

Primary Examiner—John E. Kittle
Assistant Examiner—Thomas C. Saitta
Attorney, Agent, or Firm—Spencer & Frank

[57] ABSTRACT

A blow-molded plastic hollow body has a plurality of defined, throughgoing apertures in a bottom wall adapted to be mounted on a base surface. The apertures are spaced from one another by web-like parts of the bottom wall and have a total area of between 10% and 70% of the outer face of the bottom wall.

5 Claims, 5 Drawing Figures

BLOW-MOLDED PLASTIC BODY

BACKGROUND OF THE INVENTION

This invention relates to a blow-molded plastic bodies, such as decorative or protective strips, molding, trims, spoilers, bumpers and the like, particularly for use in the automotive industry.

It is known to use blow-molded bodies for the above-outlined purpose. Thus, German Auslegeschrift (application published after examination) No. 2,536,766 discloses a strip-shaped, hollow body which is configured as a closed blow-molded body. Such blow-molded bodies can find a variety of uses as decorative and protective strips.

When used in the automotive industry, however, such blow-molded bodies proved to be disadvantageous in that due to their design as closed blow-molded bodies, their resistance to bending and torsional rigidity was found to be excessive. The rigidity of the bodies may lead to difficulties as early as during their attachment to a base surface by means of mechanical connecting members or by glueing. Due to their significant rigidity and the high resistance to bending coupled therewith, stresses during operation of the automobile reach such a high level that the strips may come loose from the vehicle body after a relatively short period of time or may entirely fall off if mounted by a glue-bond.

German Offenlegungsschrift (application published without examination) No. 3,016,652 discloses a further embodiment of a closed blow-molded body which is provided with bead-like depressions in its surfaces to compensate for differences in heat-caused expansion and contraction. According to this publication, the bead-like depressions also serve to increase the resistance to bending and the energy absorbing effect of the strips. The drawbacks of the prior art are thus not overcome by the structure disclosed in this publication.

SUMMARY OF THE INVENTION

It is an object of the invention to provide an improved blow-molded body of the above-outlined type which has a high flexibility and an appropriate rigidity for absorbing energy derived from impact-caused stresses.

This object and others to become apparent as the specification progresses, are accomplished by the invention, according to which, briefly stated, at least that wall of the blow-molded body which is designed to contact the mounting base, is provided with a plurality of defined, throughgoing apertures which are separated from one another by web-like wall portions and the total area of which is between 10% and 70%, preferably between 15% and 40%, of the entire area of the body wall in which the apertures are provided.

It was unexpectedly found that the conflicting requirements for solving the problem, namely, on the one hand, a substantial flexibility and, on the other hand, a high indentation resistance could be met by designing the blow-molded body as a blow-molded member having defined openings.

The openings according to the invention are generally disposed on the underside of the blow-molded body and may advantageously be of circular, oval or angular shape, or the combination of such configurations.

The web-like parts which separate the openings from one another may have, relative to the openings, expansion regions with which the resistance to bending and torsional rigidity of the strip may be affected. Compared to a known blow-molded strip which is 100% closed, the defined openings applied according to the present invention may take up between 10% and 70%, preferably between 15% and 40% of the total surface area of the underside of the blow-molded body.

The blow-molded body according to the invention is advantageous in that the openings provided, for example, in the rear or bottom wall of the blow-molded body in combination with the remaining webs influence the resistance to bending and torsional rigidity, while leaving the capacity for energy absorption during impact stresses practically unaffected. This unexpected combination of desirable characteristics is reflected in Table I below which is based on a blow-molded member having the following dimensions:

length 1000 mm
width 100 mm
height 20 mm
wall thickness 3 mm

TABLE I

| Number of holes in bottom wall of blow-molded body | 4 | 6 | 8 | 10 | 12 | 14 | 16 | 18 |
|---|---|---|---|---|---|---|---|---|
| % of open area of bottom wall | 10 | 15 | 20 | 25 | 30 | 35 | 40 | 45 |
| % of reduction of load stress on body relative to body with closed bottom wall | | | | | | | | |
| bending resistance | 15 | 22.5 | 30 | 37.5 | 45 | 52.5 | 60 | 67.5 |
| torsional rigidity | 30 | 45 | 60 | 75 | 83 | 87 | 90 | 91 |
| indentation resistance | 1 | 1.5 | 2 | 2.5 | 3 | 3.5 | 4 | 4.5 |

The table shows that the bending resistance, torsional rigidity and indentation resistance are dependent on the number of openings made in the underside of the blow-molded strip. Thus, for example, it is seen that in the case of six openings, 15% of the bottom face area is open, the bending resistance is reduced by 22.5% and the torsional rigidity by 45% with reference to a closed blow-molded member of identical size. Unexpectedly, the indentation resistance is reduced only by 1.5%. If 40% of the bottom face area of the blow-molded body is open according to the present invention, that is, 16 openings are provided, Table I shows that the bending resistance is reduced by 60% and the torsional rigidity by 90%. The indentation resistance in this example is reduced only by 4%.

It is considered to be unexpected that in blow-molded articles structured according to the invention the bending resistance and the torsional rigidity decrease very substantially with increasing number and size of openings in the underside of the article, while the indentation resistance decreases only slightly; in fact, it almost remains constant. This means in practice that, because of its reduced bending resistance and torsional rigidity, a blow-molded strip provided with defined openings according to the present invention can be adapted without difficulty to irregularities of the mounting surface, such as surface areas of a vehicle body, and risks that the blow-molded strip lifts off its base or separates entirely therefrom are practically eliminated. This is so because the bending resistance and torsional rigidity can be varied by appropriately selecting the number and size of the openings in the blow-molded strip. As a result, the firm seating of the blow-molded strip according to the invention—whether glued-on, or attached mechanically—will not be adversely affected by stresses derived from the operation or servicing of the vehicle, or from heat-caused deformations. Such a firm seating is of particular importance in mechanically anchored strips because of the danger that the torsional rigidity of a closed blow-molded body would cause the fastening means to be torn out of their anchors during rough driving conditions.

When adhesive strips (moldings or trims) are used in which an adhesive tape, for example a tape based on neoprene/acrylate, is applied to the underside of the closed blow-molded body, similar loosening phenomena have been observed. For example, loosening from the base was observed after about 7,000 to 10,000 changes of load on a closed blow-molded strip having the following dimensions:

length 1000 mm
width 100 mm
height 20 mm
wall thickness 3 mm

The above-given number of load changes corresponds to a vehicle service—depending on driving conditions—of 0.5 to 2 years (10,000–30,000 km).

These drawbacks are overcome by the blow-molded strip structured according to the invention.

Table II shows residual forces N for a blow-molded body according to the invention, as compared to a closed blow-molded member. The body dimensions are the same as in Table I. As seen in two selected examples, in which 15% and 40% of the bottom face has been provided with openings, the bending resistance is 45.6N and 23.6N, respectively, while the torsional rigidity is 35N and 6.5N, respectively. In contrast thereto, the indentation resistance is 33.82N and 32.96N, respectively.

TABLE II

| Number of holes in bottom wall of blow-molded body | 4 | 6 | 8 | 10 | 12 | 14 | 16 | 18 |
|---|---|---|---|---|---|---|---|---|
| % of open area of bottom wall residual force N of body relative to body with closed bottom wall | 10 | 15 | 20 | 25 | 30 | 35 | 40 | 45 |
| bending resistance | 50 | 45.6 | 41.2 | 36.8 | 32.4 | 28 | 23.6 | 19.2 |
| torsional rigidity | 45 | 35 | 25 | 16 | 10.8 | 8.3 | 6.5 | 5.1 |
| indentation resistance | 34 | 33.82 | 33.64 | 33.47 | 33.3 | 33.13 | 32.96 | 32.79 |

Table II again demonstrates the very substantial reduction of the bending resistance and torsional rigidity and the very slight decrease in indentation resistance.

DESCRIPTION OF THE PREFERRED EMBODIMENTS

Figure 1:
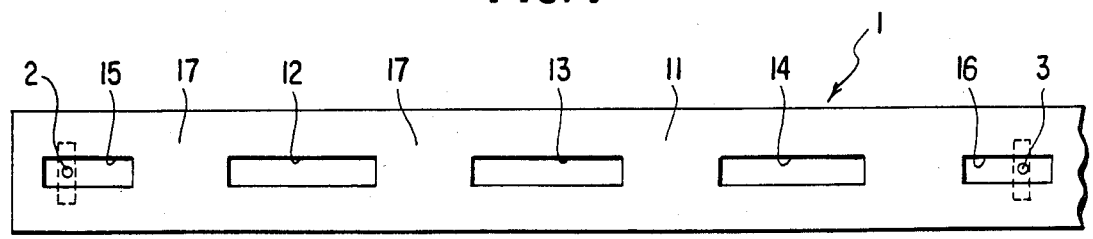
FIG. 1 is a bottom plan view of a first preferred embodiment of the invention.
Figure 1A:
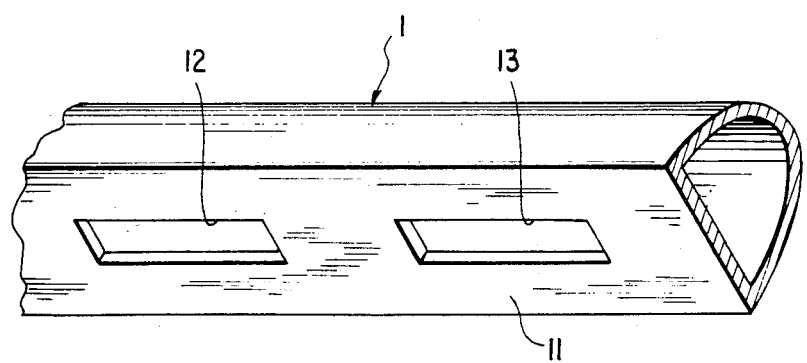
FIG. 1a is a fragmentary perspective view of the first preferred embodiment.

FIG. 1 shows the underside 11 of a blow-molded body 1 which has rectangular openings 12, 13 and 14 aligned with the longitudinal center line of the body 1. FIG. 1a shows one part of the blow-molded body 1 in a perspective illustration. Openings 12, 13 and 14 penetrate the underside (bottom wall) 11 of the blow-molded body 1. In the outer edge regions of the blow-molded body 1, fastening openings 15, 16 are provided which receive mechanical fastening means 2, 3. The fastening openings 15, 16, in conjunction with openings 12, 13, 14, likewise serve to reduce bending resistance and torsional rigidity within the scope of the invention. The openings are spaced by web-like wall parts 17 in the underside 11 of the blow-molded body 1. The fastening arrangement provides for a compensation of the longitudinal expansion of the strip due, for example, to temperature fluctuations.

Figure 2:
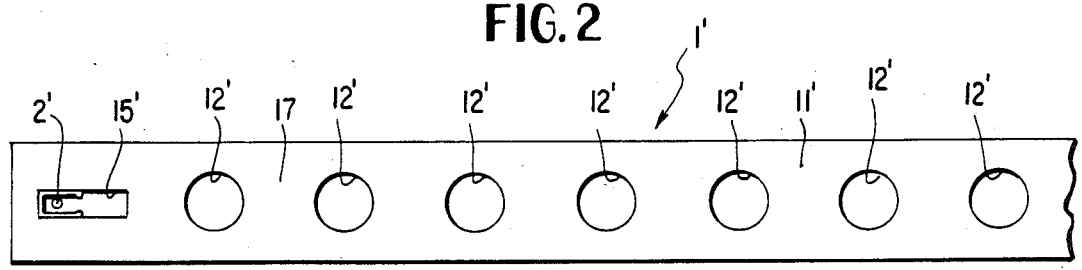
FIG. 2 is a bottom plan view of a second preferred embodiment of the invention.

In FIG. 2, circular openings 12' are made in the underside 11' of a blow-molded strip 1'. Fastening opening 15' and fastening means 2' serve the same purposes as in the embodiment of FIG. 1. The fastening means in the opposite end region of the blow-molded strip 1' may be a nonflexible screw opening in the underside of blow-molded strip 1.

Figure 3:
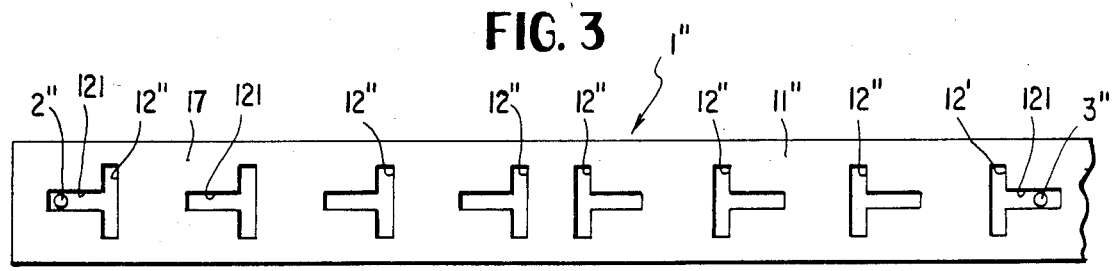
FIG. 3 is a bottom plan view of a third preferred embodiment of the invention.

In FIG. 3, the underside 11" of blow-molded strip 1" is provided with T-shaped openings 12". Four consecutive openings 12" have their T-leg 121 oriented to the left, while the T-legs 121 of the other four consecutive openings 12" are oriented towards the right. It is to be understood that any desired variations of directions may be selected. Mechanical fastening means 2", 3" are received in the T-legs 121 of the two flanking openings 12".

Figure 4:
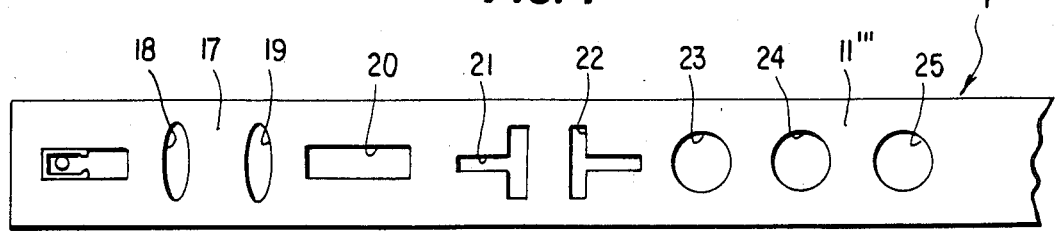
FIG. 4 is a bottom plan view of a fourth preferred embodiment of the invention.

FIG. 4 shows the underside 11''' of a blow-molded strip 1''' having a combination of differently shaped openings 18–25.

All illustrated embodiments may be solely self-adhesive or may be equipped with a combination of mechanical and adhesive fastening means.

Figure 5:
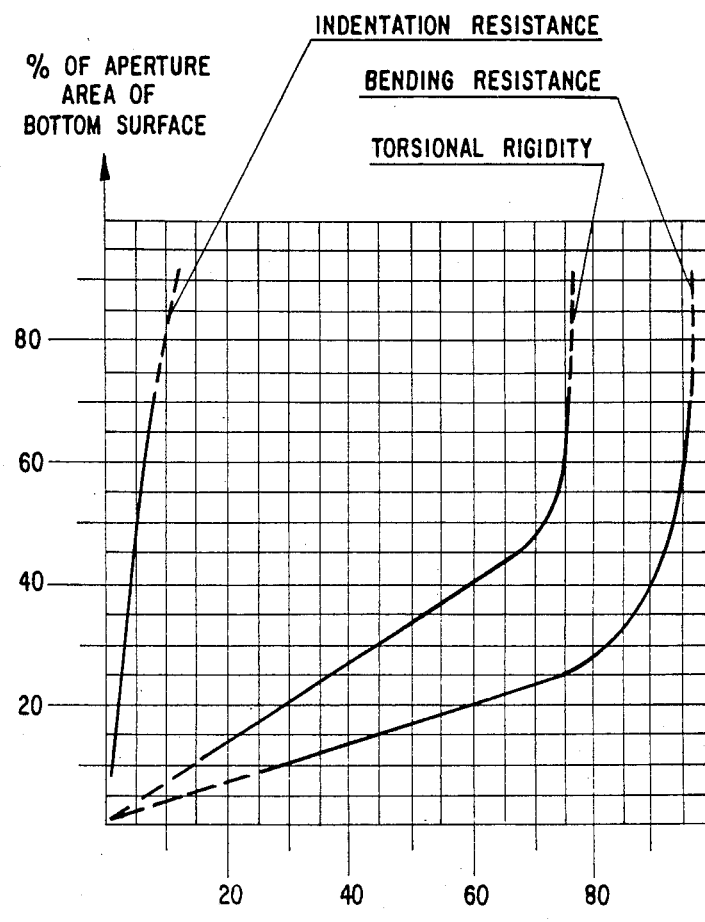
FIG. 5 is a function diagram illustrating the mechanical resistance behavior of articles structured according to the invention.

FIG. 5 is a diagram of the mechanical resistance behavior of the blow-molded strip according to the present invention. The percentage of open area in the bottom face of the blow-molded strip is plotted on the ordinate, while the force reduction in the load, expressed in percent values with reference to the closed bottom surface, is plotted on the abscissa. This illustration diagrammatically shows the data given in Table I.

It will be understood that the above description of the present invention is susceptible to various modifications, changes and adaptations, and the same are intended to be comprehended within the meaning and range of equivalents of the appended claims.

What is claimed is:

1. In a blow-molded plastic hollow body including a bottom wall having an outer face adapted to be mounted on a base surface; the improvement comprising a plurality of defined, throughgoing apertures in said bottom wall; said apertures being spaced from one another by web-like parts of said bottom wall and having a total area of between 10% and 70% of the outer face of said bottom wall.

2. A blow-molded plastic hollow body as defined in claim 1, wherein said total area is between 15% and 40% of the outer face of said bottom wall.

3. A blow-molded plastic hollow body as defined in claim 1, wherein at least one of said apertures is circular.

4. A blow-molded plastic hollow body as defined in claim 1, wherein at least one of said apertures is oval.

5. A blow-molded plastic hollow body as defined in claim 1, wherein at least one of said apertures is angular.

* * * * *